(12) United States Patent
Everett, Jr. et al.

(10) Patent No.: US 9,854,824 B2
(45) Date of Patent: Jan. 2, 2018

(54) HEATING APPLIANCE

(71) Applicant: Spectrum Brands, Inc., Middleton, WI (US)

(72) Inventors: David William Everett, Jr., Verona, WI (US); Charles Nelson, Minneapolis, MN (US); Vignesh Manikandan Pirathaban, Madison, WI (US)

(73) Assignee: Spectrum Brands, Inc., Middleton, WI (US)

( * ) Notice: Subject to any disclaimer, the term of this patent is extended or adjusted under 35 U.S.C. 154(b) by 0 days.

(21) Appl. No.: 14/688,636

(22) Filed: Apr. 16, 2015

(65) Prior Publication Data

US 2015/0299936 A1 Oct. 22, 2015

Related U.S. Application Data

(60) Provisional application No. 61/980,468, filed on Apr. 16, 2014.

(51) Int. Cl.
| | |
|---|---|
| *D06F 75/18* | (2006.01) |
| *A23L 1/01* | (2006.01) |
| *D06F 75/38* | (2006.01) |
| *H05B 3/26* | (2006.01) |
| *H05B 3/74* | (2006.01) |

(Continued)

(52) U.S. Cl.
CPC ............ *A23L 1/01* (2013.01); *A47J 31/542* (2013.01); *A47J 37/0611* (2013.01); *A47J 37/0676* (2013.01); *D06F 75/18* (2013.01); *D06F 75/38* (2013.01); *H05B 1/0269* (2013.01); *H05B 3/141* (2013.01); *H05B 3/26* (2013.01); *H05B 3/68* (2013.01); *H05B 3/681* (2013.01); *H05B 3/74* (2013.01); *H05B 3/84* (2013.01);

(Continued)

(58) Field of Classification Search
CPC .......... D06F 75/00; D06F 75/08; D06F 75/10; D06F 75/14; D06F 75/18; D06F 75/24; D06F 75/38; D06F 79/02; D06F 79/26; D06F 79/026; H05B 3/26; H05B 3/141; H05B 3/68; H05B 3/681; H05B 3/74; H05B 3/84; H05B 2203/013; H05B 1/0269; A47J 31/542; A47J 37/0611; A47J 37/0676; A23V 2002/00; A23L 1/01

See application file for complete search history.

(56) References Cited

U.S. PATENT DOCUMENTS

| | | |
|---|---|---|
| 1,366,135 A | 1/1921 | Speirs |
| 1,978,089 A | 10/1934 | Jones |

(Continued)

FOREIGN PATENT DOCUMENTS

| | | |
|---|---|---|
| CA | 2062259 | 9/1992 |
| CA | 2062259 A1 | 9/1992 |

(Continued)

OTHER PUBLICATIONS

ISR/WO, PCT/US15/25881, mailed Jul. 24, 2015, 11 pages.

(Continued)

*Primary Examiner* — Ismael Izaguirre
(74) *Attorney, Agent, or Firm* — Kagan Binder, PLLC

(57) ABSTRACT

An iron generally includes a water tank and a steam generator in flow communication with the water tank. The steam generator includes a thin-film heater tube that receives water from the water tank to generate steam inside the heater tube.

19 Claims, 12 Drawing Sheets

(51) Int. Cl.
   *H05B 3/68*    (2006.01)
   *H05B 3/84*    (2006.01)
   *A47J 37/06*   (2006.01)
   *H05B 3/14*    (2006.01)
   *A47J 31/54*   (2006.01)
   *H05B 1/02*    (2006.01)
   *D06F 79/02*   (2006.01)

(52) U.S. Cl.
   CPC ........ *A23V 2002/00* (2013.01); *D06F 79/026* (2013.01); *H05B 2203/013* (2013.01)

(56) References Cited

U.S. PATENT DOCUMENTS

| | | | |
|---|---|---|---|
| 2,509,008 A | 5/1950 | McFarland | |
| 2,863,037 A | 12/1958 | Johnstone | |
| 3,072,042 A | 1/1963 | Davis | |
| 3,074,192 A * | 1/1963 | Smith | D06F 75/38 38/71 |
| 3,092,704 A | 6/1963 | Woody et al. | |
| 3,266,661 A | 8/1966 | Dates | |
| 3,605,604 A | 9/1971 | Diebold et al. | |
| 3,725,645 A | 4/1973 | Shevlin | |
| 3,885,129 A | 5/1975 | Fabricius | |
| 3,931,494 A | 1/1976 | Fisher et al. | |
| 4,094,446 A | 6/1978 | Brutsman | |
| 4,141,286 A | 2/1979 | Smit | |
| 4,352,252 A * | 10/1982 | Brenot | F22B 1/288 122/39 |
| 4,356,381 A | 10/1982 | Flaherty, Jr. et al. | |
| 4,754,122 A | 6/1988 | Coppier | |
| 4,801,782 A | 1/1989 | Ineson | |
| 4,808,490 A | 2/1989 | Tsukuda et al. | |
| 4,825,757 A | 5/1989 | Stoner | |
| 4,888,467 A | 12/1989 | Hoffmann | |
| 4,889,974 A | 12/1989 | Auding et al. | |
| 4,941,597 A | 7/1990 | Lopez et al. | |
| 5,019,691 A | 5/1991 | Lai | |
| 5,040,700 A | 8/1991 | Compton | |
| 5,208,896 A | 5/1993 | Katayev | |
| 5,283,420 A | 2/1994 | Montalto | |
| 5,369,398 A | 11/1994 | Vancha | |
| 5,434,388 A * | 7/1995 | Kralik | F24H 1/121 219/522 |
| 5,475,199 A * | 12/1995 | Buchanan | H05B 3/262 156/579 |
| 5,616,266 A | 4/1997 | Cooper | |
| 5,721,418 A * | 2/1998 | Hazan | D06F 75/40 219/257 |
| 5,881,710 A | 3/1999 | Davis et al. | |
| 5,990,456 A | 11/1999 | Kilbride | |
| 6,018,897 A * | 2/2000 | Lin | D06F 75/24 219/254 |
| 6,035,563 A * | 3/2000 | Hoefer | B05B 17/0638 38/77.1 |
| 6,037,572 A | 3/2000 | Coates et al. | |
| 6,072,161 A | 6/2000 | Stein | |
| 6,192,787 B1 | 2/2001 | Montalto | |
| 6,310,329 B1 | 10/2001 | Carter | |
| 6,311,868 B1 | 11/2001 | Krietemeier et al. | |
| 6,376,816 B2 | 4/2002 | Cooper et al. | |
| 6,403,928 B1 | 6/2002 | Ford | |
| 6,624,391 B2 | 9/2003 | Yamazaki | |
| 6,674,052 B1 | 1/2004 | Luo | |
| 6,748,646 B2 | 6/2004 | Von Arx et al. | |
| 2,840,802 A1 | 1/2005 | Shepherd | |
| 7,607,246 B2 | 10/2009 | Valiyambath Krishnan et al. | |
| 7,797,863 B2 * | 9/2010 | Moreno Jordana | D06F 75/24 38/93 |
| 7,907,835 B2 * | 3/2011 | Boussemart | F24H 9/2028 392/479 |
| 7,926,209 B2 * | 4/2011 | Yeung | H05B 3/265 38/93 |
| 8,188,965 B2 | 5/2012 | Yang | |
| 8,216,622 B2 | 7/2012 | Evans et al. | |
| 8,618,448 B2 | 12/2013 | Alexander | |
| 8,759,721 B1 | 6/2014 | Alexander | |
| 9,186,006 B2 | 11/2015 | Soule | |
| 9,265,371 B2 | 2/2016 | Glucksman et al. | |
| 9,494,311 B2 * | 11/2016 | Moughton | F24H 1/142 |
| 2002/0051632 A1 | 5/2002 | Kodden et al. | |
| 2003/0066825 A1 | 4/2003 | Leutner et al. | |
| 2003/0146204 A1 | 8/2003 | Kaastra | |
| 2004/0146289 A1 * | 7/2004 | Sakamoto | F22B 1/284 392/465 |
| 2005/0160635 A1 * | 7/2005 | Chen | F22B 1/285 38/77.81 |
| 2006/0043087 A1 | 3/2006 | Gagas et al. | |
| 2006/0081603 A1 | 4/2006 | Van Der Meulen | |
| 2009/0184102 A1 | 7/2009 | Parker, Jr. et al. | |
| 2009/0272728 A1 | 11/2009 | Abbott | |
| 2010/0012643 A1 | 1/2010 | Li et al. | |
| 2010/0058623 A1 | 3/2010 | Fernandez | |
| 2010/0218684 A1 | 9/2010 | Etter et al. | |
| 2010/0224618 A1 | 9/2010 | Lin | |
| 2011/0259869 A1 | 10/2011 | Hlavaty | |
| 2012/0037009 A1 | 2/2012 | Blanc et al. | |
| 2012/0061372 A1 * | 3/2012 | James | D06F 75/24 219/254 |
| 2012/0163780 A1 | 6/2012 | De Luca | |
| 2013/0019756 A1 | 1/2013 | Coats et al. | |
| 2013/0125427 A1 | 5/2013 | De Vries et al. | |
| 2013/0125760 A1 | 5/2013 | Pitrucha | |
| 2013/0319996 A1 | 12/2013 | Harward et al. | |
| 2014/0209598 A1 | 7/2014 | Bonnel | |
| 2015/0366246 A1 | 12/2015 | Johnson et al. | |

FOREIGN PATENT DOCUMENTS

| | | |
|---|---|---|
| CN | 2867110 | 2/2007 |
| CN | 202161163 | 3/2012 |
| GB | 900517 | 4/1962 |
| GB | 900517 A | 7/1962 |
| WO | 9909791 | 2/1999 |
| WO | 9909791 A1 | 2/1999 |
| WO | 0067527 | 11/2000 |
| WO | 0067527 A1 | 11/2000 |
| WO | 2009085038 | 7/2009 |
| WO | 2009085038 A1 | 7/2009 |
| WO | 2010131017 | 11/2010 |
| WO | 2010131017 A2 | 11/2010 |
| WO | 2013038186 | 3/2013 |
| WO | 2013038186 A1 | 3/2013 |

OTHER PUBLICATIONS

ISR/WO, PCT/US15/026242, mailed Jul. 8, 2015, 50 pages.
ISR/WO, PCT/US15/026236, mailed Oct. 087, 2015, 24 pages.
International Search Report for PCT/US2015/026236 dated Oct. 7, 2015.

* cited by examiner

HEATING APPLIANCE

CROSS-REFERENCE TO RELATED APPLICATIONS

This application claims the benefit of U.S. Provisional Application No. 61/980,468 filed Apr. 16, 2014, which is incorporated by reference herein in its entirety.

BACKGROUND

The present invention relates generally to heating appliances and, more particularly, to an appliance for ironing cloth-like materials.

Conventional clothing irons include a housing, a sole plate attached to the housing, and a heating device contained within the housing for heating the sole plate. When the heated sole plate is pressed against a wrinkled article of clothing, the heated sole plate facilitates removing the wrinkles. Many conventional clothing irons also include a steaming device for moistening the article of clothing to ease the wrinkle removal process.

However, conventional irons tend to be heavier than desired, tend to have a slower than desirable heat-up time, and tend to have a less than desirable steaming capability. Moreover, conventional irons often have a power cord that makes the iron difficult to store, in addition to limiting the user to ironing near an external power supply (e.g., a wall-mounted plug socket).

There is a need, therefore, for an iron that is lighter, is quicker to heat-up, has an improved steaming capability, and/or is usable in places where an external power supply is not readily accessible.

SUMMARY

In one embodiment, an iron generally comprises a water tank and a steam generator in flow communication with the water tank. The steam generator includes a thin-film heater tube that receives water from the water tank to generate steam inside the heater tube.

In another embodiment, an iron generally comprises a water tank and a sole plate unit. The sole plate unit includes a sole plate and a thin-film heater plate that heats the sole plate, and the sole plate unit has a plurality of holes. The iron also includes a plurality of steam generator devices each coupled in flow communication between the water tank and one of the holes of the sole plate unit.

In yet another embodiment, a cordless iron generally comprises a sole plate, a thin-film heater plate that heats the sole plate, and a battery that supplies the thin-film heater plate with electrical current. The iron also comprises a dampening mechanism with a biasing element that biases the sole plate away from the heater plate.

BRIEF DESCRIPTION

Corresponding reference characters indicate corresponding parts throughout the several views of the drawings.

DETAILED DESCRIPTION

Figure 1:
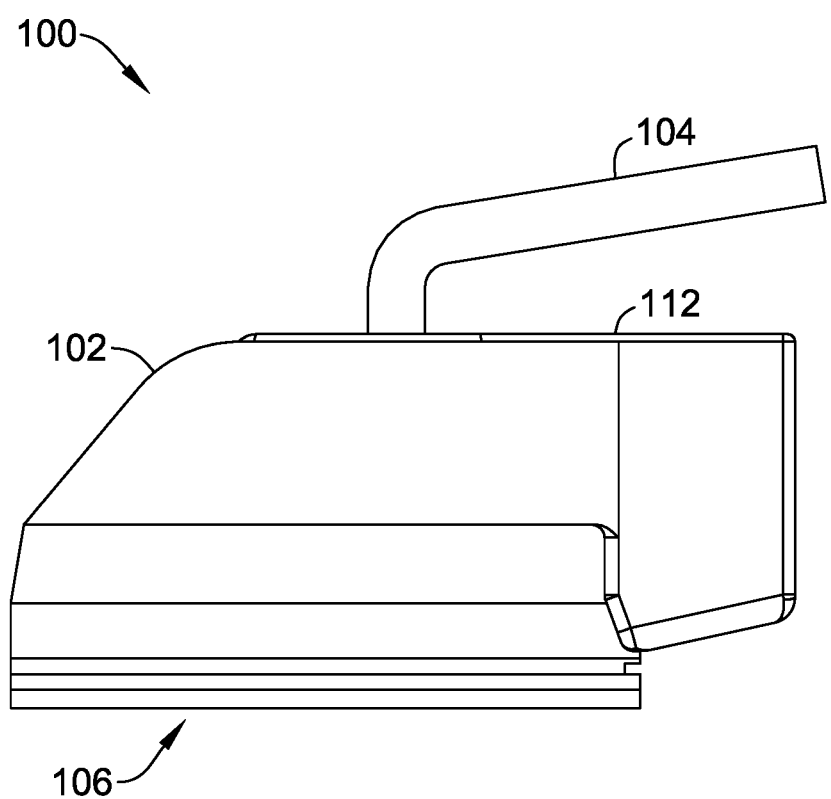
FIG. 1 is a side view of one embodiment of a heating appliance.

Referring to the drawings, and in particular to FIG. 1, a heating appliance is illustrated in the form of a clothing iron (indicated generally by the reference numeral 100). The iron 100 includes a housing 102, a handle 104 mounted on the top of the housing 102, and a heating device (indicated generally by the reference numeral 106) mounted on the bottom of the housing 102. In other contemplated embodiments, the handle 104 may be positioned at any suitable location on the housing 102.

Figure 2:
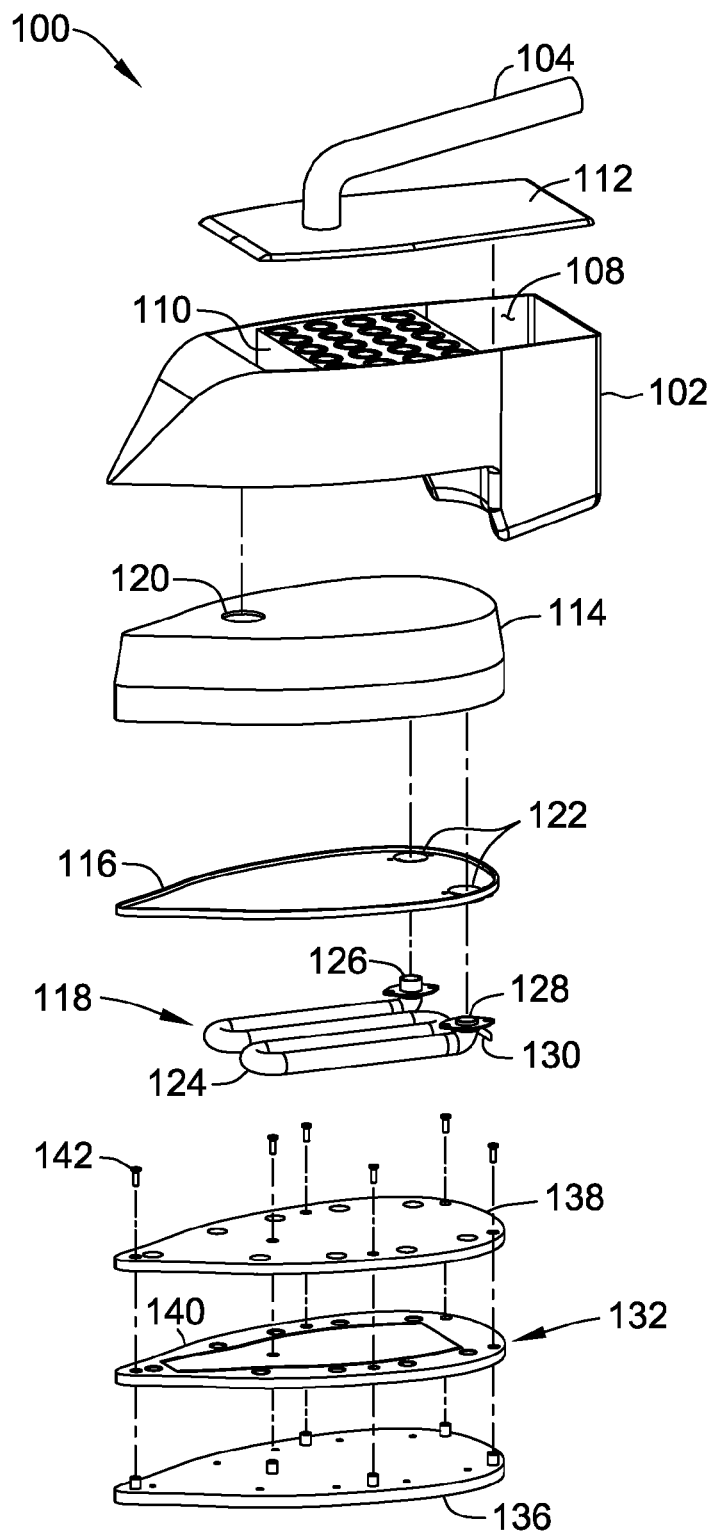
FIG. 2 is an exploded view of the heating appliance of FIG. 1.
Figure 3:
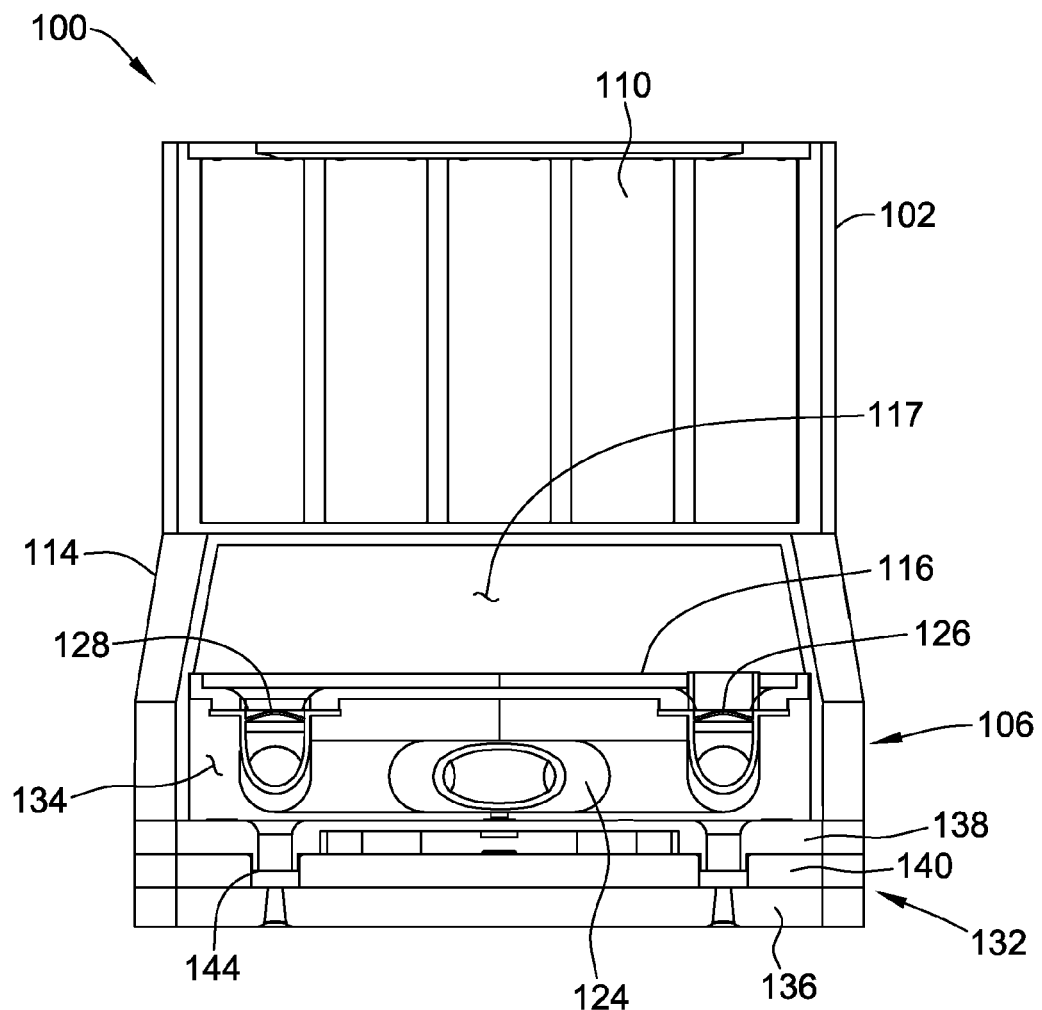
FIG. 3 is a cross-sectional view of the heating appliance of FIG. 1 with its handle removed.

With reference now to FIGS. 2 and 3, the housing 102 defines an interior compartment 108 in which at least one battery pack 110 is contained, and the interior compartment 108 is covered by a panel 112 with which the handle 104 is integrally formed. As such, when access to the battery pack 110 is desired, the panel 112 and the handle 104 are conjointly detachable from the housing 102 to expose the interior compartment 108 to the user. In other contemplated embodiments, however, the handle 104 may not be detachable from the housing 102 (e.g., the handle 104 may be integrally molded with the housing 102), in which case the handle-less panel 112 would nonetheless be detachable from the housing 102 for exposing the interior compartment 108 to the user.

The illustrated battery pack 110 is removable from the interior compartment 108 for replacement such as, for example, when the battery back 110 is in need of charging. In this manner, the iron 100 is said to be cordless (i.e., the iron 100 is usable without a power cord connecting the iron 100 to a plug socket which provides access to an external power supply). While the iron 100 is cordless in the illustrated embodiment, it is contemplated that, in other embodiments, the iron 100 may have a suitable power cord in lieu of, or in addition to, the battery pack 110.

In accordance with its cordless configuration, the illustrated iron 100 is provided in a kit along with a docking station and, optionally, at least one alternate battery pack. In one embodiment, the docking station may be suitably configured to receive only the battery pack 110 (and not the entire iron 100) for charging the battery pack 110 after the battery pack 110 has been removed from the interior compartment 108. In the embodiments set forth below, however, the docking station is configured to receive the entire iron 100 for charging the battery pack 110 while the battery pack 110 remains within the interior compartment 108 of the housing 102.

Suitably, the battery pack 110, and/or the iron 100 generally, are fitted with at least one electrical contact for interfacing with a corresponding electrical contact of the docking station to electrically connect the battery pack 110 to the docking station. Because the docking station has a power cord electrically connecting the docking station to an external power supply (via a plug socket mounted on a wall, for example), the battery pack 110 is supplied with electrical power and is thereby charged when the battery pack 110, and/or the entire iron 100, is seated on the docking station. In one contemplated embodiment, when heating the iron 100 to a preset temperature upon initial power-up, the iron 100 is to be provided with electrical power from the external power source via the docking station if the iron 100 is seated on the docking station. As such, the iron 100 essentially uses the battery pack 110 as back-up power for maintaining the iron 100 at the preset temperature after the iron 100 has been removed from the docking station.

Also contained within the interior compartment 108 of the housing 102 is a suitable control unit (not shown) having at least a microcontroller and a memory for storing instructions to be executed by the microcontroller, wherein the instructions enable the microcontroller to operate the iron 100 (e.g., the heating device 106) in the manner set forth below. A suitable user interface (e.g., a keypad and a display) is also provided on the housing 102 to enable user interaction with the control unit when operating the iron 100. Optionally, the control unit may be configured for wireless user interaction via a remote user interface provided on a handheld device, such as a smartphone for example.

In the illustrated embodiment, the heating device 106 includes a water tank body 114, a water tank cover 116 mounted inside the water tank body 114 to define a water tank 117, and a steam generator (indicated generally by reference numeral 118) attached to the bottom of the water tank cover 116. The water tank body 114 has an inlet port 120 that permits a user to pour water into the water tank 117, and the water tank cover 116 has a pair of outlet ports 122 that permit releasing water from the water tank 117 into the steam generator 118. While the water tank cover 116 is suitably mounted inside the water tank body 114 in the illustrated embodiment, it is contemplated that the water tank cover 116 may be integrally formed with the water tank body 114 in other embodiments.

The illustrated steam generator 118 has a thin-film heater tube 124 that has a serpentine profile, with an inlet valve 126 (e.g., a one-way valve) coupled to one end of the heater tube 124, a relief valve 128 (e.g., a one-way valve) coupled to the other end of the heater tube 124, and an outlet conduit 130 adjacent the relief valve 128. The inlet valve 126 and the relief valve 128 are each connected to one of the outlet ports 122 of the water tank cover 116 so as to be in flow communication with the water tank 117. The inlet valve 126 is configured to selectively permit water entry into the heater tube 124 from the water tank 117, and the outlet conduit 130 is configured to exhaust steam from the heater tube 124 for use in an ironing operation, as set forth in more detail below. The relief valve 128 is configured to release water/steam back into the water tank 117 in the event of an overflow or overpressure condition within the heater tube 124. Notably, in some embodiments, the inlet valve 126 may be self-actuating in response to pressure within the heater tube 124; and, in other embodiments, the inlet valve 126 may be selectively actuated by the control unit (e.g., the control unit may be in communication with a suitable sensor that indicates the amount of pressure within the heater tube 124).

The heating device 106 further includes a sole plate unit (indicated generally by reference numeral 132) suitably attached near the bottom of the water tank body 114 beneath the water tank cover 116 in spaced relation, thereby defining a chamber 134 in which the steam generator 118 is housed. The sole plate unit 132 includes a sole plate 136, an insulator 138, and a thin-film heater plate 140 sandwiched between the sole plate 136 and the insulator 138. The insulator 138 and the heater plate 140 are attached to the sole plate 136 via a plurality of fasteners (e.g., screws 142). Optionally, the sole plate 136 may be made of aluminum, or any other suitable material.

Because the steam generator 118 is contained within the chamber 134 between the sole plate unit 132 and the water tank cover 116, steam exhausted from the outlet conduit 130 of the steam generator 118 flows into the chamber 134. The steam then circulates within the chamber 134 and is permitted to exit the chamber 134 via a plurality of holes 144 through the sole plate unit 132 to facilitate applying the steam to a clothing article that is in contact with the sole plate 136 during an ironing operation. The sole plate unit 132 may have any suitable number of holes 144 arranged in any suitable manner that facilitates enabling the iron 100 to function as described herein.

In the illustrated embodiment, the heater tube 124 and the heater plate 140 are both said to be of the "thin-film" type in the sense that each has a substrate (e.g., a glass, glass-ceramic, or non-glass ceramic substrate) and an electrically conductive material (e.g., a metal oxide material such as tin oxide or aluminum oxide) deposited on the substrate, wherein the substrate and the electrically conductive material have a collective thickness that is only marginally greater than the thickness of the substrate itself (i.e., the electrically conductive material forms a thin film on the substrate). Suitably, it is contemplated that any number of barrier layers may be attached to the faces of the substrate to cover and protect the substrate and/or the electrically conductive material from damage, and the addition of such barrier layers would not, in and of itself, make the heater tube 124 and/or the heater plate 140 not be of the "thin-film" type.

The heater tube 124 and the heater plate 140 are heated by the control unit supplying electrical current to the electrically conductive material deposited on their respective substrates. Because the electrically conductive material naturally resists the flow of current therethrough, the electrically conductive material heats up as a result. Such heating of the electrically conductive material causes the respective substrates to be heated by virtue of being in conductive heat transfer with the electrically conductive material. Thus, in terms of the heater tube 124, electrical current supplied to the electrically conductive material of the heater tube 124 causes at least a radially inner segment of the heater tube 124 to be heated, which in turn causes water within the heater tube 124 to be heated for generating steam within the heater tube 124. In terms of the heater plate 140, electrical current supplied the electrically conductive material of the heater plate 140 causes at least the outer face of the heater plate 140 (i.e., the face oriented toward the sole plate 136) to be heated, which in turn causes the sole plate 136 to be heated.

Because electrical current is supplied from the battery pack 110 to the electrically conductive material of the heater tube 124 and to the electrically conductive material of the heater plate 140 by the control unit, the control unit may be suitably configured to modulate the flow of electrical current from the battery pack 110 to the electrically conductive material to facilitate regulating the temperature of the substrates of the heater tube 124 and/or the heater plate 140 independent of one another (and, hence, the quantity of steam generated by the heater tube 124 and/or the temperature of the sole plate 136 independent of one another). In one example, the control unit may be operatively connected to a suitable temperature sensor for regulating a temperature of the heater tube 124 to facilitate preventing the heater tube 124 from overheating in the event that little or no water is present within the heater tube 124. In some instances, a typical temperature difference between the substrate of the heater plate 140 and the ironing surface of the sole plate 136 may be about 70° C., for example.

Generally speaking, the number of battery packs 110, and the size and quantity of batteries per battery pack 110, is selected to facilitate supplying the instantaneous current needs of the heater tube 124 and the heater plate 140 when the iron 100 is operated away from the docking station in a cordless manner. In one particular embodiment, for example, the quantity of batteries in the battery pack 110 depends at least in part upon the voltage/current that is to be supplied to the heater tube 124 and/or the heater plate 140. In that regard, the electrical properties (e.g., the supply voltage and resistance) of the heater tube 124 and the heater plate 140 are selected such that their instantaneous current needs are met by the battery pack 110 alone, using, for example, a DC-DC converter topology or by connecting the DC battery voltage directly to the heater tube 124 and the heater plate 140 using power path switches. Optionally, an active cell balancing circuit may be provided for increased battery pack sizes and/or quantities. Moreover, the control unit may be configured to monitor the battery pack 110 while the battery pack 110 is charging and/or discharging to facilitate identifying over voltage, under voltage, over current, and over temperature events.

Figure 4:
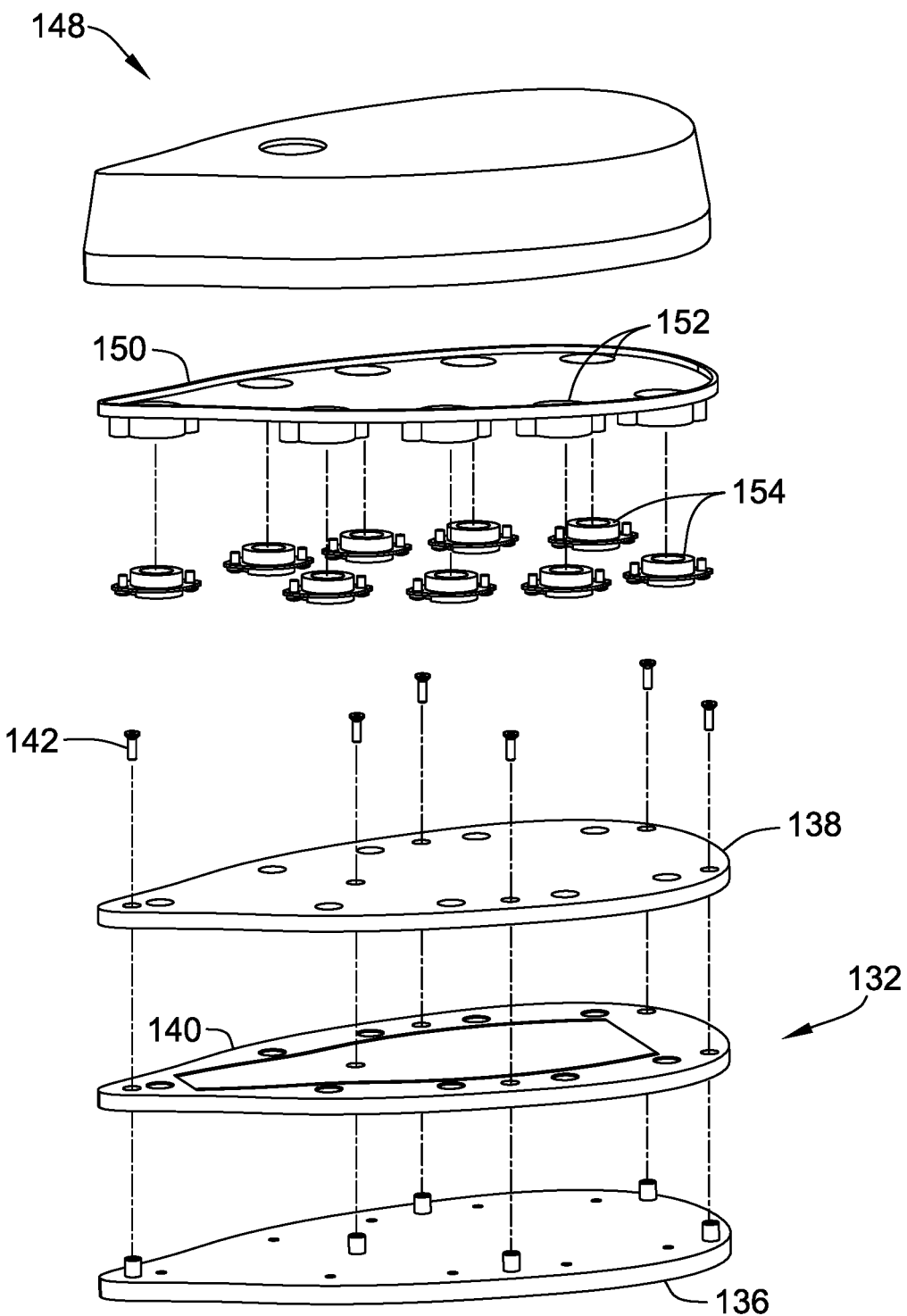
FIG. 4 is an exploded view of a heating device for use in the heating appliance of FIG. 1.
Figure 5:
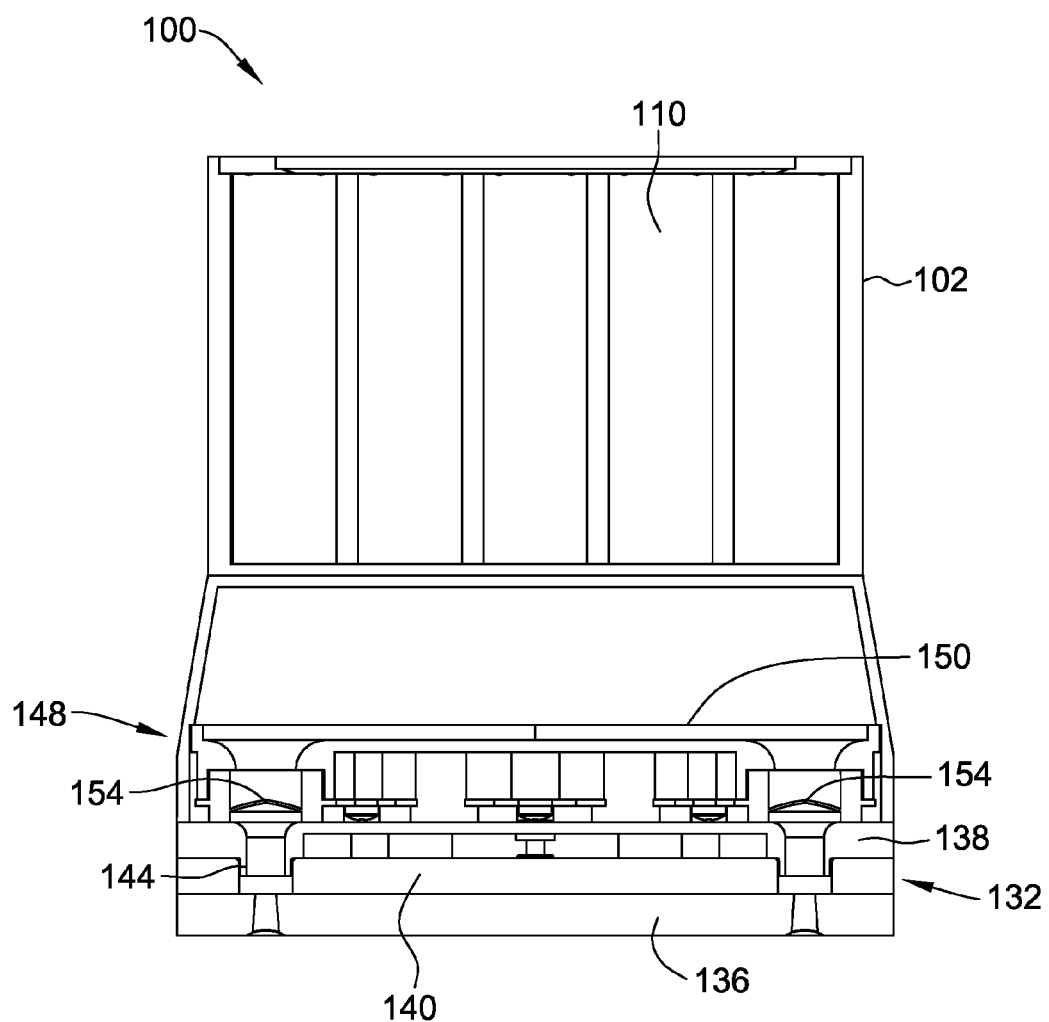
FIG. 5 is a cross-sectional view of the heating appliance of FIG. 1 having the heating device of FIG. 4 with its handle removed.
Figure 6:
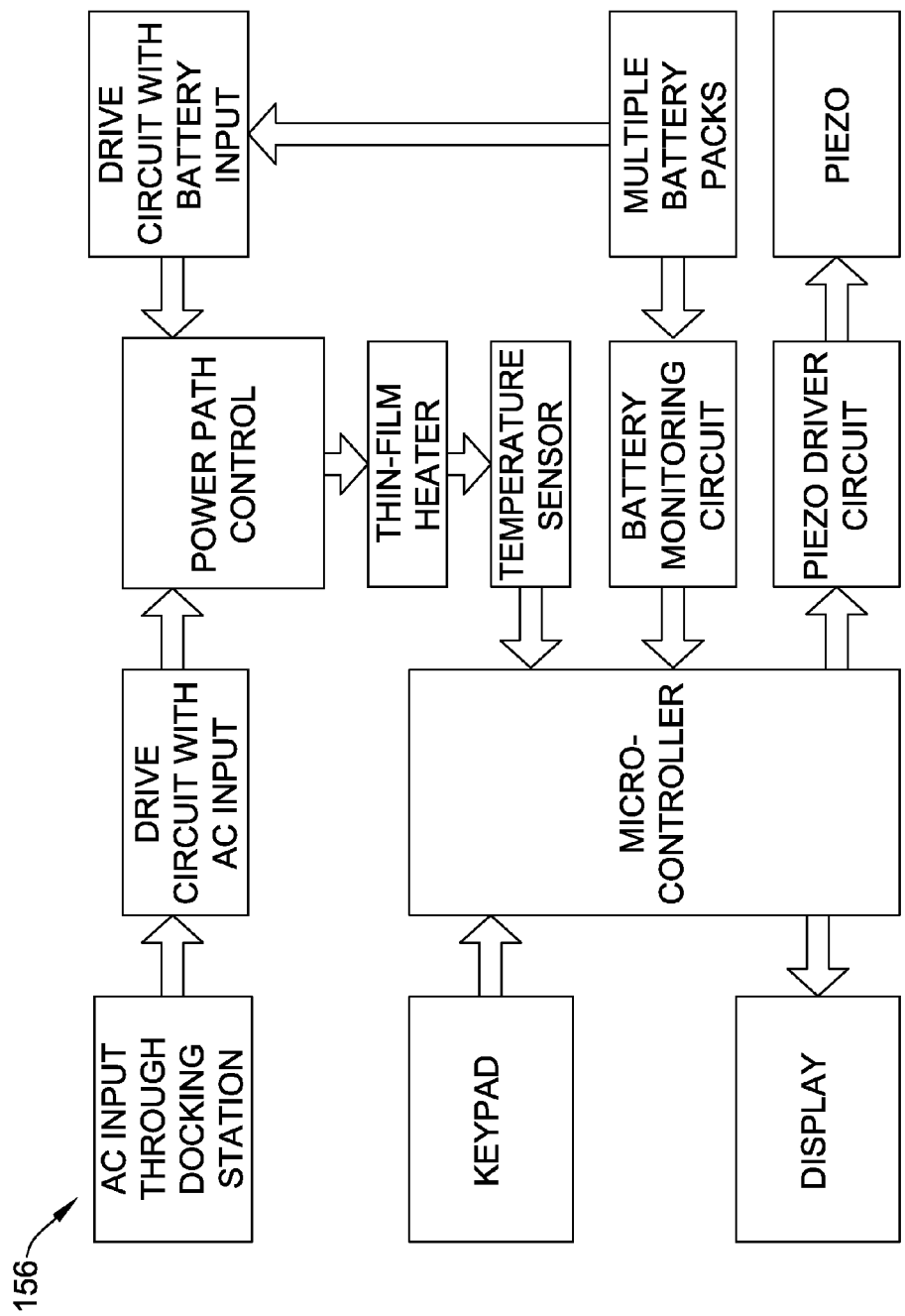
FIG. 6 is a flow chart illustrating an algorithm for use by a control unit of the heating appliance of FIG. 1 to operate the heating device of FIG. 4.

Referring now to FIGS. 4 and 5, an alternative embodiment of a heating device (indicated generally by the reference numeral 148) may be used in place of the heating device 106. The heating device 148 has a water tank cover 150 with a plurality of outlet ports 152 to each of which is coupled a steam generator device (e.g., a piezo atomizer device 154) in flow communication with the water tank. In this manner, the piezo atomizer devices 154 may be selectively actuated by the control unit to generate steam that is exhausted from the iron 100 through corresponding holes 144 formed in the sole plate unit 132 to facilitate applying the steam to a clothing article in contact with the sole plate 136 during an ironing operation. Any suitable quantity of the piezo atomizer devices 154 may be utilized in the heating device 148, and the sole plate 136 may have any quantity of corresponding holes 144 to suit. Moreover, the control unit may be suitably configured to operate the heating device 148 using a process 156 represented in the chart of FIG. 6, for example.

Optionally, to facilitate applying steam to a clothing article in a desired quantity and/or profile, the control unit may be suitably configured to selectively actuate only a subset of the piezo atomizer devices 154, as opposed to actuating all of the piezo atomizer devices 154 simultaneously. In that regard, the control unit may be further configured to permit the user to select a steam setting (e.g., a quantity and/or profile of steam output) from a plurality of optional steam settings (e.g., a plurality of optional steam quantities and/or profiles), wherein the user may be permitted to select (via the user interface) whether all or a subset (and which particular subset) of the piezo atomizer devices 154 are to be used when generating steam.

Figure 7:
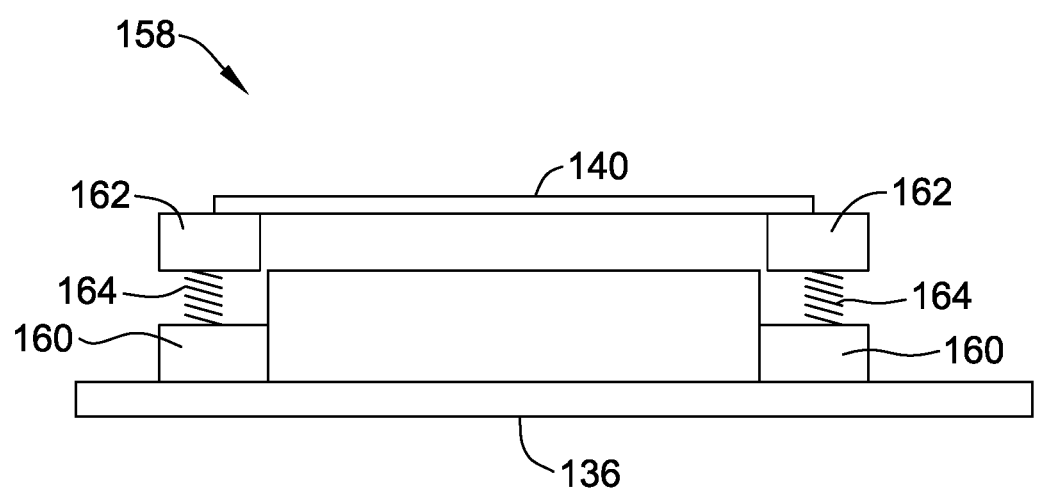
FIG. 7 is an embodiment of a dampening mechanism for use in the heating appliance of FIG. 1.

Referring now to FIG. 7, the sole plate unit 132 of the illustrated embodiment may further include a dampening mechanism (generally indicated by reference numeral 158) that facilitates mechanically isolating the heater plate 140 from the sole plate 136 when the iron 100 is handled by the user (e.g., when the user is transporting the iron 100 from the docking station to the clothing article, and vice versa). The illustrated dampening mechanism 158 includes a plurality of first attractive members (e.g., electromagnets 160) coupled to the sole plate 136, and a plurality of second attractive members (e.g., metal elements 162) coupled to the heater plate 140. A suitable biasing element (e.g., a coil spring 164) extends between each electromagnet 160 and an associated one of the metal elements 162.

In this manner, when the iron 100 is seated on the docking station, the control unit energizes the electromagnets 160 to draw the electromagnets 160 into contact with their respective metal elements 162 against the bias of the coil springs 164. A thermally conductive path is thus established between the sole plate 136 and the heater plate 140 through the electromagnets 160 and the metal elements 162 for heating the sole plate 136 to a preset temperature when the iron 100 is seated on the docking station.

Once the user removes the iron 100 from the docking station (e.g., after the preset temperature has been reached), the control unit de-energizes the electromagnets 160 such that the coil springs 164 are permitted to decompress and push the sole plate 136 away from the heater plate 140 in preparation of the iron 100 being transported to the clothing article. Then, when the sole plate 136 is pressed against the clothing article, the sole plate 136 is displaced toward the heater plate 140, thereby bringing the electromagnets 160 back into contact with their respective metal elements 162 to again establish a thermally conductive path from the heater plate 140 to the sole plate 136 for heating the sole plate 136 while the clothing article is being ironed. Subsequently, when the sole plate 136 is no longer pressed against the clothing article (e.g., after the ironing operation has been completed), the coil springs 164 are again permitted to decompress and push the sole plate 136 away from the heater plate 140 in preparation of the iron 100 being transported back to the docking station.

The dampening mechanism 158 thereby facilitates spacing the sole plate 136 away from the heater plate 140 in situations when the iron 100 is not docked or the sole plate 136 is not pressed against a clothing article. In this manner, if the iron 100 was to be dropped during transport, the coil springs 164 would dampen (or slow) the inward displacement of the sole plate 136 toward the heater plate 140, thereby reducing the impact of the sole plate 136 against the heater plate 140 and minimizing associated damage to the heater plate 140 that could have otherwise resulted had the sole plate 136 been in contact with (or in closer proximity to) the heater plate 140 when the iron 100 was dropped (e.g., the dampening mechanism 158 facilitates preventing fracture of the heater plate 140 if the iron 100 is dropped).

In one contemplated embodiment, the dampening mechanism 158 may not include the attractive members (e.g., the electromagnets 160 and the metal elements 162), such that the coil springs 164 bias the sole plate 136 away from the heater plate 140 even when the iron 100 is seated on the docking station. In such an embodiment, the coil springs 164 may themselves provide a thermally conductive path between the sole plate 136 and the heater plate 140 when the sole plate 136 is being heated to a preset temperature on the docking station. Such an embodiment may also have a plurality of collapsible members (e.g., telescoping posts) that provide a thermally conductive path from the sole plate 136 to the heater plate 140 when the coil springs 164 are in their decompressed state, such that the collapsible members collapse when the sole plate 136 is displaced toward the heater plate 140 (e.g., when the sole plate 136 is pressed against a clothing article, or when the sole plate 136 impacts an object upon dropping the iron 100 during transport).

Optionally, in another contemplated embodiment, the iron 100 may also include (in conjunction with, or in lieu of, the dampening mechanism 158) a plurality of actively extendable, mechanical limbs that facilitate actively pulling the sole plate 136 inward and actively pushing the sole plate 136 outward with the user's press of a button disposed on the housing 102 of the iron 100. Alternatively, the user may not need to press a button to actuate the limbs but, rather, the limbs may be automatically actuated by the control unit in response to the position of the iron 100 (e.g., in response to seating of the iron 100 on the docking station, or contact of the sole plate 136 with a clothing article using suitable sensors). Moreover, the limbs may not actively push or pull the sole plate 136 in some contemplated embodiments but, rather, the limbs may instead function to facilitate guiding the inward displacement and restricting the outward displacement of the sole plate 136 as caused by the dampening mechanism 158.

As shown in FIGS. 8-11, various alternative embodiments of the sole plate unit 132 are contemplated. Notably, in each of these alternative embodiments of the sole plate unit 132, holes 165 are provided for receiving steam from the steam generator 118 or the piezo atomizer devices 154 in the manner set forth above.

Figure 8:
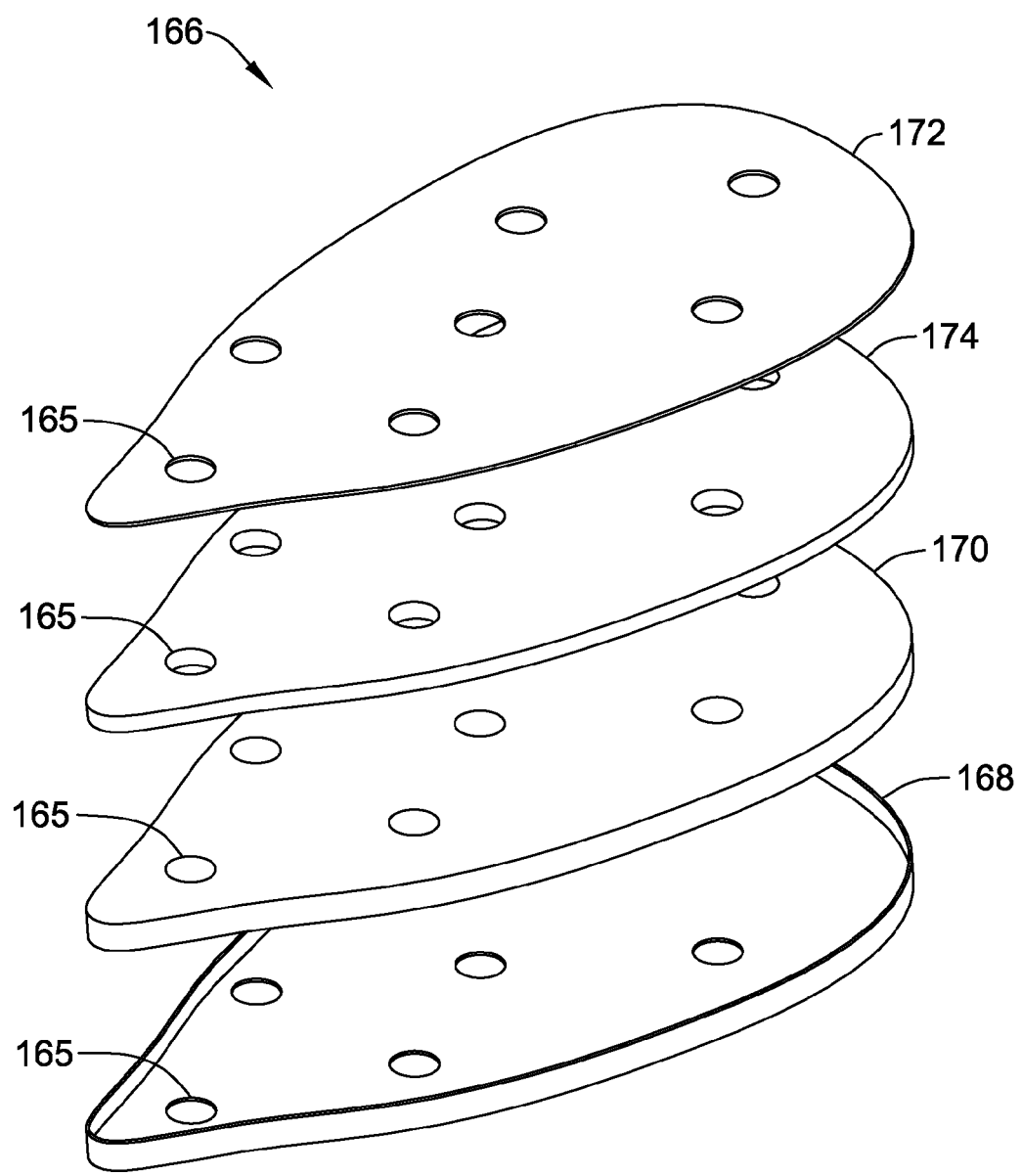
FIG. 8 is an embodiment of a sole plate unit for use in the heating appliance of FIG. 1.

As shown in FIG. 8, one embodiment of a sole plate unit (indicated generally by reference numeral 166) has a sole plate cover 168, at least one metal (e.g., aluminum) foam layer (or pad) 170, and an insulator 172 between which a thin-film heater plate 174 is sandwiched, such that the metal foam layer 170 provides a thermally conductive path from the heater plate 174 to the sole plate cover 168, while also cushioning the heater plate 174 on the sole plate cover 168 to facilitate minimizing damage to the heater plate 174 if the iron 100 is dropped.

Figure 9:
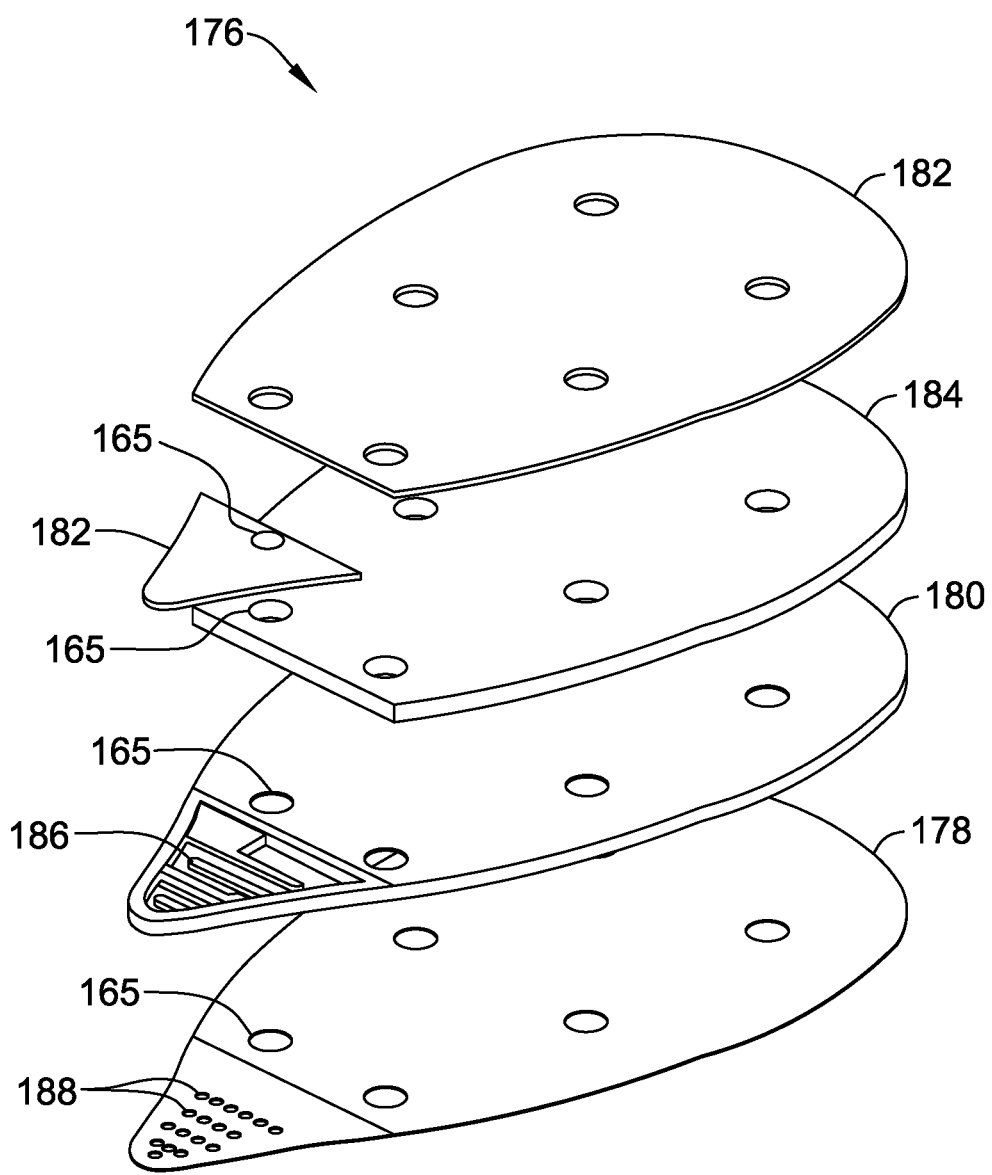
FIG. 9 is another embodiment of a sole plate unit for use in the heating appliance of FIG. 1.

As shown in FIG. 9, another embodiment of a sole plate unit (indicated generally by reference numeral 176) may be configured to perform a front vapor burst function. More specifically, the sole plate unit 176 has a sole plate cover 178, a sole plate 180, and an insulator 182 between which a thin-film heater plate 184 is sandwiched. The sole plate 180 has an isolated front cavity 186 with a plurality of smaller holes in communication with smaller holes 188 of the sole plate cover 178 for applying a burst of steam to the clothing unit being ironed.

Figure 10:
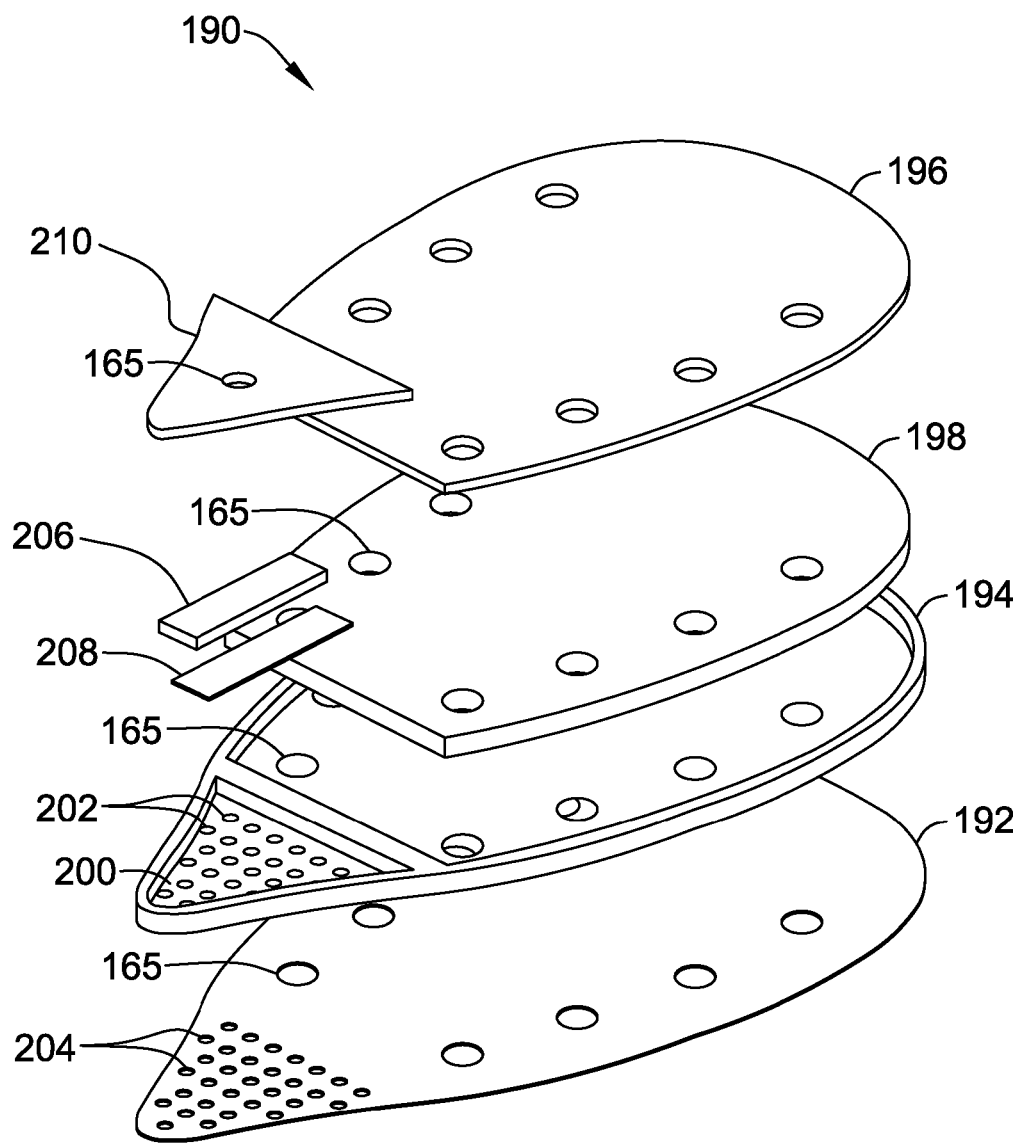
FIG. 10 is yet another embodiment of a sole plate unit for use in the heating appliance of FIG. 1.

As shown in FIG. 10, another embodiment of a sole plate unit (indicated generally by reference numeral 190) may also be configured to perform a front vapor burst function. More specifically, the sole plate unit 190 has a sole plate cover 192, a sole plate 194, and an insulator 196 between which a thin-film heater plate 198 is sandwiched. The sole plate 194 has an isolated front cavity 200 having a plurality of smaller holes 202 in communication with similarly sized holes 204 of the sole plate cover 192. Notably, the heater plate 198 is sized to cover and heat only back and middle segments of the sole plate 194, while the front cavity 200 of the sole plate 194 is heated by a thin-film heater strip 206. The heater strip 206 is disposed within the front cavity 200 and is inverted relative to the heater plate 198 (i.e., the heater strip 206 has its outward face covered by an insulator strip 208, leaving its inward face exposed) such that water droplets falling onto the inward face of the heater strip 206 generate a burst of steam that flows through the holes 202, 204 and onto the clothing article being ironed. A suitable cover 210 is provided over the front cavity 200 and the heater strip 206 to facilitate keeping the steam burst from exiting the front cavity 200 other than through the holes 202, 204.

Figure 11:
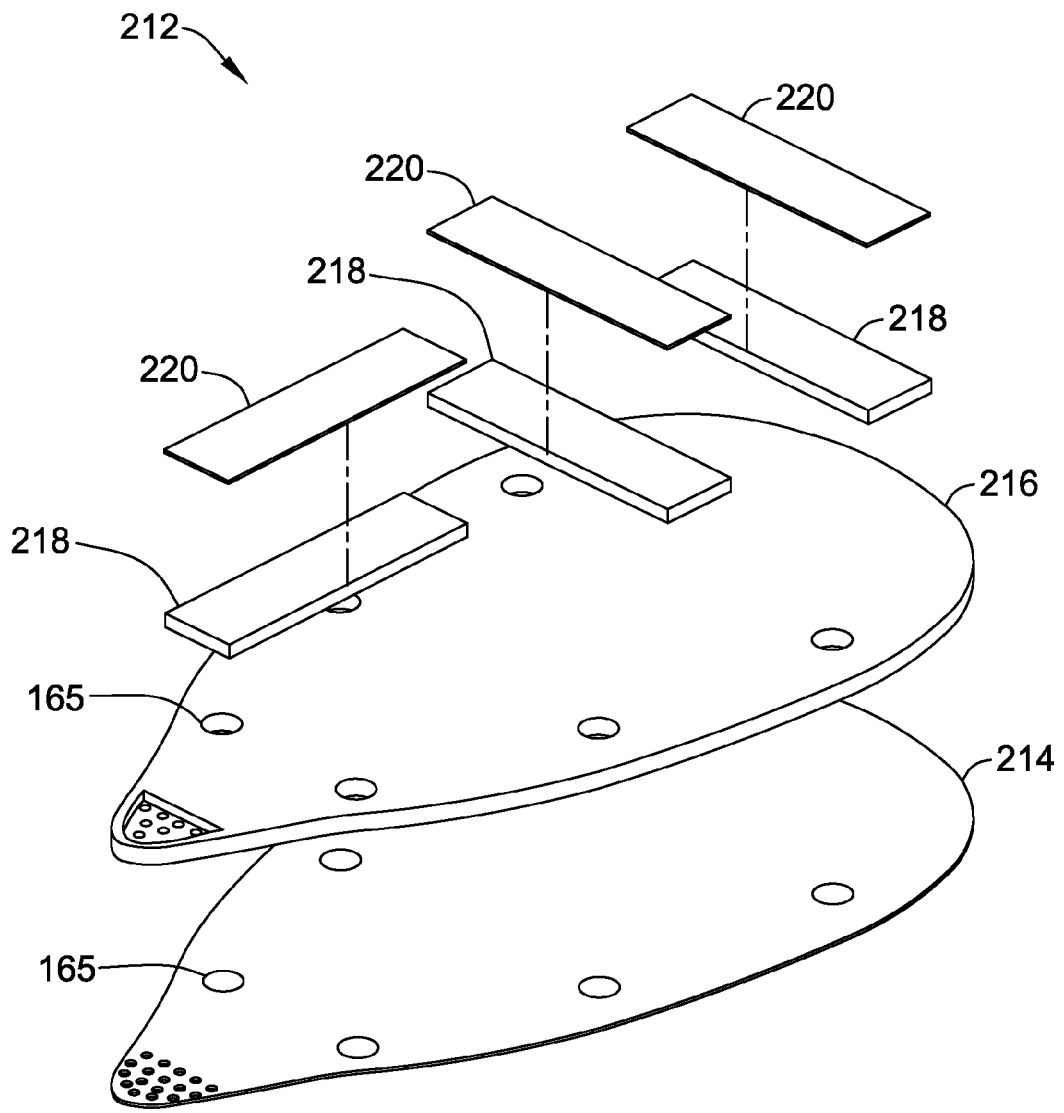
FIG. 11 is yet another embodiment of a sole plate unit for use in the heating appliance of FIG. 1.

As shown in FIG. 11, another embodiment of a sole plate unit (indicated generally by reference numeral 212) has a sole plate cover 214 and a sole plate 216. Notably, the sole plate unit 212 does not have a thin-film heater plate that covers a majority segment of the sole plate 216 but, instead, has a plurality of spaced-apart, thin-film heater strips 218 for heating the sole plate 216. The heater strips 218 may be sized and arranged in any suitable manner, and each heater strip 218 is sandwiched between the sole plate 216 and a dedicated insulator strip 220. Optionally, as illustrated, this embodiment may be suitably configured to perform a front steam burst function.

Figure 12:
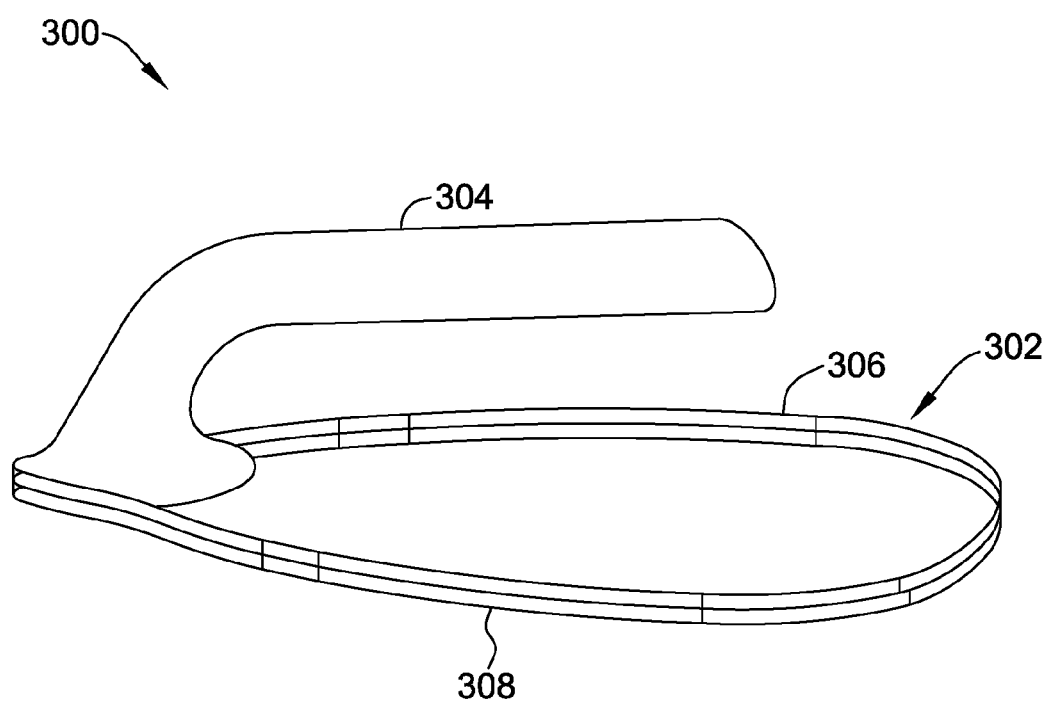
FIG. 12 is a perspective view of another embodiment of a heating appliance.

Referring now to FIG. 12, an alternative embodiment of an iron 300 is illustrated and includes only a sole plate unit (indicated generally by reference numeral 302) and a handle 304 suitably coupled to the sole plate unit 302. The iron 300 is cordless (e.g., is battery powered) and has a wattage of between about 2000 W and about 2400 W, for example. Notably, the sole plate unit 302 has only two layers, namely a thin-film heater plate 306 and a sole plate 308, both of which are substantially transparent. For instance, the sole plate 308 may be made of glass, while the substrate of the heater plate 306 (and any associated barrier layers coupled to the heater plate 306) are also made of glass. In this manner, the entire iron 300 (other than the handle 304) is substantially transparent to facilitate viewing the clothing article through the iron 300. Moreover, the handle 304 contains a suitable battery and control unit for operating the heater plate 306 (i.e., for supplying electrical current to the electrically conductive material of the heater plate 306, which is sandwiched between the sole plate 308 and the substrate of the heater plate 306). Along these same lines, in the embodiments of the iron 100 set forth above for FIGS. 1-11, any suitable component of the iron 100 (e.g., the housing, the heater plate(s) (or heater strip(s)), the sole plate, etc.) may be substantially transparent to facilitate viewing the clothing article through the iron 100.

In accordance with the embodiments set forth above, and due at least in part to the efficiencies associated with thin-film heating elements (e.g., the weight savings, the quicker heat-up time, the lower energy consumption, the more precise temperature regulation, etc.), the irons 100 and/or 300 are configured to be lighter, to be quicker to heat-up, to have an improved steaming capability, and/or to be powered by a battery (and thereby made cordless) for use in places where an external power supply is not readily accessible. The irons 100, 300 are, therefore, an improvement over at least some conventional irons.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. An iron comprising:
   a water tank; and
   a steam generator in flow communication with the water tank, wherein the steam generator comprises a thin-film heater tube that receives water from the water tank to generate steam inside the heater tube, wherein the steam generator has a relief valve attached to the heater tube, the relief valve configured to release steam back into the water tank in the event of an overpressure condition within the heater tube.

2. The iron of claim 1 wherein the heater tube has a serpentine profile.

3. An iron comprising:
   a water tank;
   a steam generator in flow communication with the water tank, wherein the steam generator comprises a thin-film heater tube that receives water from the water tank to generate steam inside the heater tube; and
   a sole plate unit disposed beneath the water tank in spaced relation to define a chamber in which the steam generator is disposed.

4. The iron of claim 3 wherein the steam generator is configured to release steam into the chamber.

5. The iron of claim 4 wherein the sole plate unit has a plurality of holes for exhausting steam from the chamber.

6. The iron of claim 5 wherein the sole plate unit comprises a thin-film heater plate.

7. The iron of claim 6 wherein the holes extend through the heater plate.

8. The iron of claim 6 further comprising a battery that supplies electrical current to the heater tube and the heater plate.

9. The iron of claim 1 further comprising a battery that supplies electrical current to the heater tube.

10. An iron comprising:
    a water tank;
    a sole plate unit comprising a sole plate and a thin-film heater plate that heats the sole plate, wherein the sole plate unit has a plurality of holes; and
    a plurality of steam generator devices each coupled in flow communication between the water tank and one of the holes of the sole plate unit.

11. The iron of claim 10 wherein each of the steam generator devices is a piezo atomizer device.

12. The iron of claim 10 further comprising a battery that supplies electrical current to the heater plate.

13. The iron of claim 10 wherein the water tank comprises a water tank cover having a plurality of outlet ports each coupled in flow communication with one of the steam generator devices.

14. The iron of claim 10 wherein the holes extend through the heater plate.

15. A cordless iron comprising;
    a sole plate;
    a thin-film heater plate that heats the sole plate;
    a battery that supplies the thin-film heater plate with electrical current; and
    a dampening mechanism comprising a biasing element that biases the sole plate away from the heater plate.

16. The cordless iron of claim 15 wherein the dampening mechanism comprises attractive members configured to draw the sole plate toward the heater plate against the bias of the biasing element.

17. The cordless iron of claim 16 wherein the attractive members comprise an electromagnet coupled to one of the sole plate and the heater plate, and a metallic element coupled to the other of the sole plate and the heater plate.

18. A kit comprising the cordless iron of claim 17 wherein the kit includes a docking station that receives the iron and causes the electromagnet to be energized for drawing the sole plate toward the heater plate when the iron is seated on the docking station.

19. The kit of claim 18 wherein the docking station electrically connects the battery to an external power supply for charging the battery when the iron is seated on the docking station.

* * * * *